(12) United States Patent
Suzuki

(10) Patent No.: US 9,493,110 B2
(45) Date of Patent: Nov. 15, 2016

(54) VEHICULAR HEADLAMP

(71) Applicant: KOITO MANUFACTURING CO., LTD., Tokyo (JP)

(72) Inventor: Tomokazu Suzuki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/329,281

(22) Filed: Jul. 11, 2014

(65) Prior Publication Data

US 2015/0022084 A1 Jan. 22, 2015

(30) Foreign Application Priority Data

Jul. 18, 2013 (JP) .................... 2013-149312

(51) Int. Cl.
*B60Q 1/26* (2006.01)
*B60Q 1/14* (2006.01)

(52) U.S. Cl.
CPC ......... *B60Q 1/1415* (2013.01); *B60Q 2400/30* (2013.01)

(58) Field of Classification Search
USPC .................................. 315/76–77, 79–80, 82
See application file for complete search history.

(56) References Cited

U.S. PATENT DOCUMENTS

| | | | |
|---|---|---|---|
| 2004/0257820 A1 | 12/2004 | Kletensky et al. | |
| 2009/0046474 A1* | 2/2009 | Sato ...................... | B60Q 1/076 362/466 |
| 2009/0072764 A1* | 3/2009 | Kitagawa ........... | H05B 33/0845 315/320 |
| 2009/0254247 A1* | 10/2009 | Osanai .................. | B60Q 1/143 701/36 |
| 2012/0113662 A1* | 5/2012 | Shibata et al. ................ | 362/512 |
| 2012/0158254 A1* | 6/2012 | Takagaki ............... | B60Q 1/085 701/49 |
| 2013/0002135 A1* | 1/2013 | Kanamori et al. ............. | 315/82 |

FOREIGN PATENT DOCUMENTS

| | | |
|---|---|---|
| CN | 102510819 A | 6/2012 |
| EP | 2213935 A1 | 8/2010 |
| EP | 2541132 A2 | 1/2013 |
| JP | 2004-311448 A | 11/2004 |
| JP | 2010-015752 A | 1/2010 |
| JP | 2013-8636 A | 1/2013 |

OTHER PUBLICATIONS

First Office Action issued in corresponding Chinese Application No. 201410321776.3, mailed on Dec. 4, 2016 (17 pages).

* cited by examiner

*Primary Examiner* — Minh D A
(74) *Attorney, Agent, or Firm* — Osha Liang LLP

(57) ABSTRACT

A vehicular headlamp has a light source portion that provides a low beam lighting mode, a high beam lighting mode, and a dimming lighting mode, a light source power supply portion that supplies to the light source portion a lighting current having a current value according to lighting mode, a light distribution mechanism portion that switches light distribution of illumination light by the light source portion according to the lighting mode, and a control portion that, at least in the dimming lighting mode, causes the light source power supply portion to supply lighting current having a second current value lower than a first current value for the low beam lighting mode.

6 Claims, 6 Drawing Sheets

FIG. 3

LIGHTING MODE CONTROL EXAMPLE I

| LIGHTING MODE | LOW BEAM | HIGH BEAM | DRL |
|---|---|---|---|
| LIGHT EMISSION DRIVE CURRENT VALUE | 1.5A(1.7A) | 1.7A | 0.7A(1.7A) |
| SOLENOID | OFF(ON) | ON | OFF(ON) |

※SETTING FOR PASSING SHOWN IN PARENTHESES

LIGHTING MODE CONTROL EXAMPLE II

| LIGHTING MODE | LOW BEAM | HIGH BEAM | DRL |
|---|---|---|---|
| LIGHT EMISSION DRIVE CURRENT VALUE | 1.5A(1.5A) | 1.5A | 0.7A(1.5A) |
| SOLENOID | OFF(ON) | ON | OFF(ON) |

※SETTING FOR PASSING SHOWN IN PARENTHESES

LIGHTING MODE CONTROL EXAMPLE III

| LIGHTING MODE | LOW BEAM | HIGH BEAM | DRL |
|---|---|---|---|
| LIGHT EMISSION DRIVE CURRENT VALUE | 1.5A(1.7A) | 1.7A | 0.3A(1.7A) |
| SOLENOID | OFF(ON) | ON | ON(ON) |

※SETTING FOR PASSING SHOWN IN PARENTHESES

LIGHTING MODE CONTROL EXAMPLE IV

| LIGHTING MODE | LOW BEAM | HIGH BEAM | DRL |
|---|---|---|---|
| LIGHT EMISSION DRIVE CURRENT VALUE | 1.5A(1.5A) | 1.5A | 0.3A(1.5A) |
| SOLENOID | OFF(ON) | ON | ON(ON) |

※SETTING FOR PASSING SHOWN IN PARENTHESES

VEHICULAR HEADLAMP

BACKGROUND

Technical Field

The present invention relates to vehicular headlamps.

Related Art

[Patent Document 1]

Japanese Patent Application Laid-Open (Kokai) No. 2010-15752

[Patent Document 2]

Japanese Patent Application Laid-Open (Kokai) No. 2013-8636

The amount of light, the light distribution state, etc. of vehicular headlamps are designed according to various functions such as a low beam, a high beam, daytime running lamps (DRL), and a clearance lamp (CLL).

Patent Document 1 discloses a lighting control device that controls lighting of a plurality of lamp units having these different functions.

Patent Document 2 discloses a mechanism that changes a light distribution state by, e.g., an actuator using a solenoid.

SUMMARY

Vehicular lamps may require lamp units having various functions, and a more efficient configuration or drive control method has been desired.

According to one or more embodiments of the present invention, an illumination operation has a plurality of functions to be performed by switching a lighting mode, and an appropriate passing operation to be implemented in this state.

A vehicular headlamp according to one or more embodiments of the present invention includes: a light source portion that provides lighting in each lighting mode of low beam lighting, high beam lighting, and dimming lighting; a light source power supply portion that supplies to the light source portion a lighting current having a current value according to the lighting mode; a light distribution mechanism portion that switches light distribution of illumination light by the light source portion according to the lighting mode; and a control portion that, at least in the dimming lighting, causes the light source power supply portion to supply the lighting current having a second current value lower than a first current value for the low beam lighting, and if a passing command is sent during the dimming lighting, causes the light source power supply portion to supply the lighting current having a current value higher than the second current value and causes the light distribution mechanism portion to implement light distribution of the high beam lighting.

One or more embodiments of the present invention employs the configuration in which each lighting mode is implemented by switching among the low beam lighting, the high beam lighting, and the dimming lighting in the light source portion. In the case of the dimming lighting, the current value lower than at least the current value for the low beam lighting is used as a drive current. However, if the passing operation is performed at this time, a sufficient passing function is not obtained due to an insufficient amount of light. Accordingly, the passing operation is performed by temporarily switching the current value to a higher current value and controlling the light distribution to a state similar to that in the high beam lighting.

In a vehicular headlamp according to one or more embodiments of the present invention, a control portion executes the low beam lighting, the high beam lighting, and the dimming lighting by combination of switching of the lighting current from the light source power supply portion between or among two or more different current values including the first and second current values and switching of the light distribution by the light distribution mechanism portion.

For the low beam lighting, the high beam lighting, and the dimming lighting, the light emission operation is performed by using different amounts of light for each lighting mode, and the light emission state corresponding to each function is obtained according to the light distribution state.

In a vehicular headlamp according to one or more embodiments of the present invention, the light distribution mechanism portion has an actuator that switches the light distribution, and a circuit component other than a coil forming a drive circuit that drives a power portion of the actuator be mounted on a circuit board having at least a circuit component as the control portion mounted thereon.

This may eliminate the need to use a substrate etc. for the actuator.

In a vehicular headlamp according to one or more embodiments of the present invention, a reverse connection protection diode in the circuit component of the control portion is used also as a reverse connection protection diode in the drive circuit of the actuator.

This may reduce the number of parts on the circuit board.

According to one or more embodiments of the present invention, an efficient overall headlamp configuration is implemented by the vehicular headlamp that performs a lighting operation in each lighting mode of low beam lighting, high beam lighting, and dimming lighting. Moreover, a passing operation can be performed with a sufficient amount of light, whereby an appropriate passing operation can be implemented in combination with a light distribution operation.

BRIEF DESCRIPTION OF THE DRAWINGS

FIG. 3 shows illustrations of lighting mode control examples according to one or more embodiments of the present invention.

DETAILED DESCRIPTION

Figure 1:
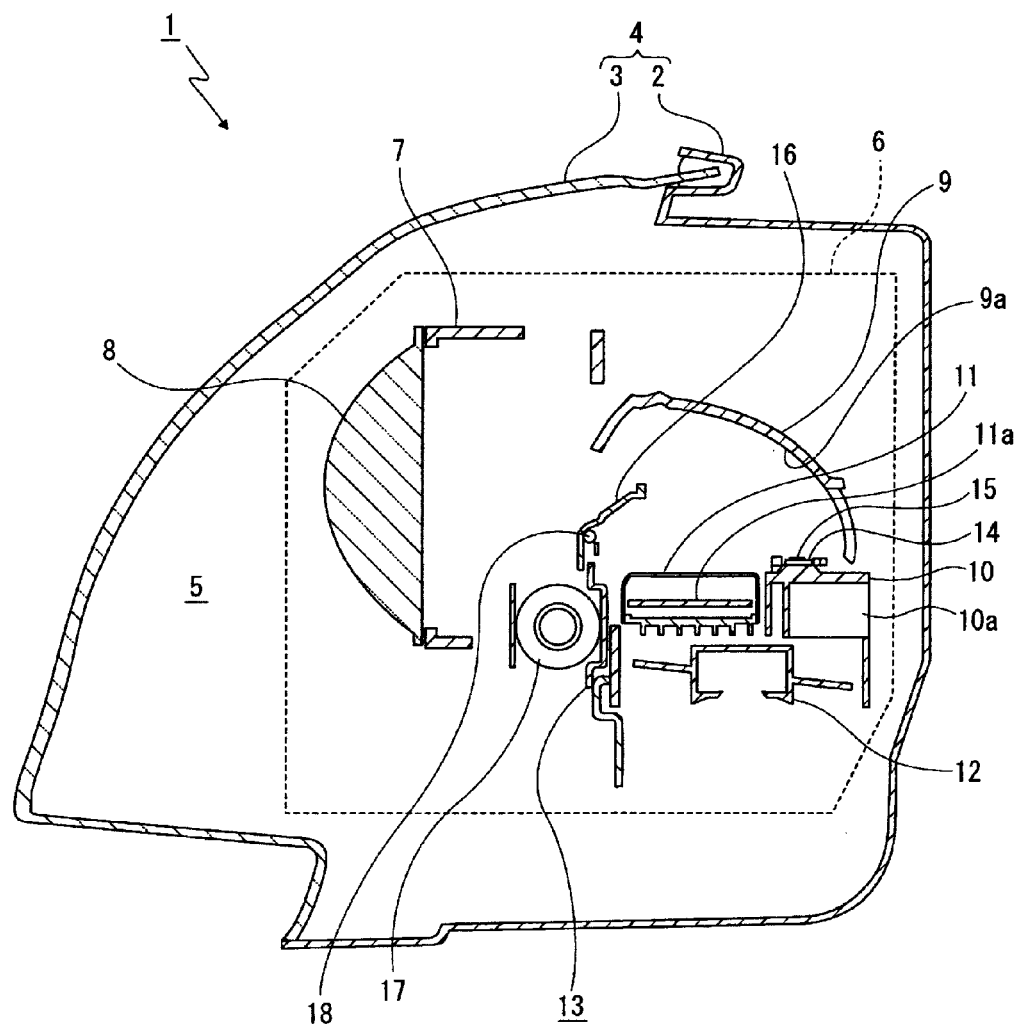
FIG. 1 is a schematic vertical sectional view of a vehicular headlamp according to one or more embodiments of the present invention.

Embodiments of the present invention will be described below. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First, the general structure of a vehicular headlamp 1 will be described with reference to FIG. 1. The vehicular headlamp 1 is attached and placed in each of the right and left ends of the front end of a vehicle body.

The vehicular headlamp 1 includes a lamp housing 2 having a recess that opens to the front, and a cover 3 closing the opening of the lamp housing 2. A lamp outer casing 4 is formed by the lamp housing 2 and the cover 3, and the internal space of the lamp outer casing 4 is formed as a lamp chamber 5.

A lamp unit 6 is placed in the lamp chamber 5. The lamp unit 6 has a lens holder 7, a projection lens 8, a reflector 9, a light source unit 10, a control circuit unit 11, a cooling fan 12, and a light control mechanism 13.

The projection lens 8 is a plano-convex lens having a generally hemispherical outer shape, and is attached to the front end of the lens holder 7.

The reflector 9 is attached to the upper surface of the light source unit 10. The inner surface of the reflector 9 is formed as a reflective surface 9a, and reflects light from the light source unit 10 to guide the reflected light to the projection lens 8.

The light source unit 10 and the control circuit unit 11 are placed below the reflector 9.

The light source unit 10 has a circuit board 14 and a light source portion 15 mounted on the upper surface of the circuit board 14. The light source portion 15 is formed by connecting a plurality of semiconductor light-emitting elements in series with each other. For example, light-emitting diodes (LEDs) are used as the semiconductor light-emitting elements in the light source portion 15.

A heat sink 10a is formed below the circuit board 14 in the light source unit 10. Heat generated by the control circuit unit 11, the circuit board 14, and the light source portion 15 is transferred to the heat sink 10a. The cooling fan 12 placed below the light source unit 10 and the control circuit unit 11 blows air to the heat sink 10a.

The control circuit unit 11 is placed in front of the light source unit 10. The control circuit unit 11 contains a circuit board 11a described below.

The cooling fan 12 contains a fan motor 12a described below, and rotates according to rotation of the fan motor 12a. The rotation of the cooling fan 12 suppresses an increase in temperature in the lamp outer casing 4.

The light control mechanism 13 is placed between the lens holder 7 and the reflector 9. This light control mechanism 13 has a movable shade 16 and a shade drive portion 17.

The movable shade 16 is pivotable between a first state where the movable shade 16 blocks part of light emitted from the light source portion 15 and a second state where the movable shade 16 blocks a smaller amount of light emitted from the light source portion 15 than in the first state, by using a pivot shaft 18 as a fulcrum point. A low beam light distribution state is implemented when the movable shade 16 is in the first state, and a high beam light distribution state is implemented when the movable shade 16 is in the second state.

The shade drive portion 17 includes an actuator 17a described below, and transmits power of the actuator 17a to pivot the movable shade 16 between the first state and the second state. In one or more embodiments of the present invention, a solenoid is used for a power portion of the actuator 17a. The movable shade 16 is held in the first state (low beam light distribution state) when no current is applied to the actuator 17a. Accordingly, a current is applied to the actuator 17a in order to maintain the second state (high beam light distribution state).

Figure 2:
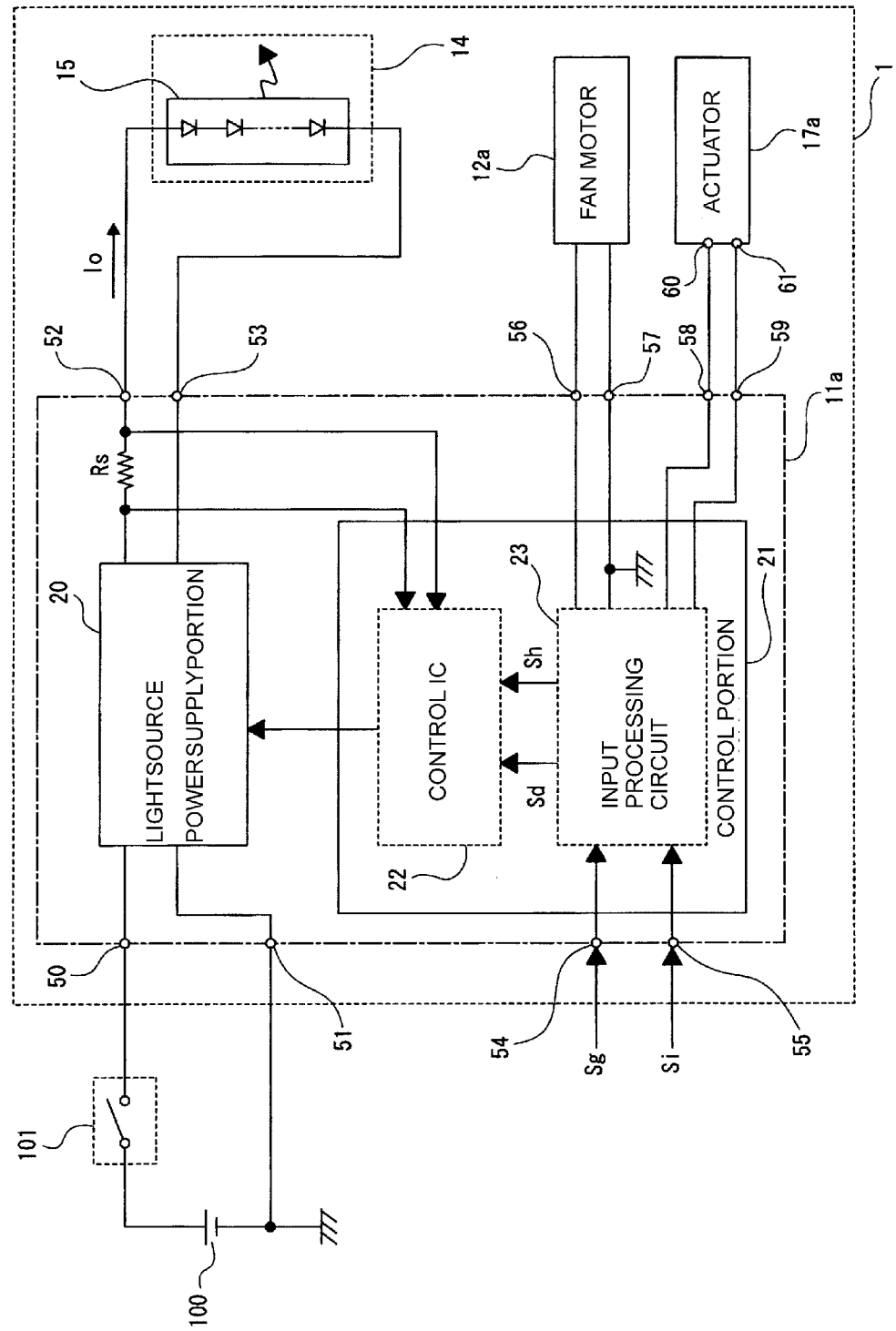
FIG. 2 is a block diagram of the vehicular headlamp according to one or more embodiments of the present invention.

FIG. 2 is a block diagram illustrating the circuit configuration in the vehicular headlamp 1. FIG. 2 also shows an on-board battery 100 and a lighting switch 101 which are provided outside the vehicular headlamp 1.

In addition to the circuit board 11a, the circuit board 14, and the light source portion 15 which are shown in FIG. 1, the fan motor 12a formed in the cooling fan 12 and the actuator 17a formed in the shade drive portion 17 are provided in the vehicular headlamp 1.

A light source power supply portion 20 and a control portion 21 are formed on the circuit board 11a. Moreover, terminals, namely a positive-side input terminal 50, a negative-side input terminal 51, a positive-side output terminal 52, a negative-side output terminal 53, a dimming signal input terminal 54, a brightening signal input terminal 55, a fan positive terminal 56, a fan negative terminal 57, an actuator positive terminal 58, and an actuator negative terminal 59, and a resistor Rs are formed on the circuit board 11a.

The light source power supply portion 20 is formed by, e.g., a DC-to-DC converter as a switching regulator. A positive input of the light source power supply portion 20 is connected to the positive-side input terminal 50, and a negative input thereof is connected to the negative-side input terminal 51. A positive output of the light source power supply portion 20 is connected to the positive-side output terminal 52 via the resistor Rs, and a negative output thereof is connected to the negative-side output terminal 53.

The positive-side input terminal 50 is connected to the positive side of the on-board battery 100 via the lighting switch 101, and the negative-side input terminal 51 is connected to the negative (GND) side of the on-board battery 100. The positive-side output terminal 52 and the negative-side output terminal 53 are connected to the anode terminal and the cathode terminal of the plurality of LEDs forming the light source portion 15.

The light source power supply portion 20 steps up or down a direct current (DC) voltage produced between the positive-side input terminal 50 and the negative-side input terminal 51 when the lighting switch 101 is turned on, and thus produces between the positive-side output terminal 52 and the negative-side output terminal 53 an output voltage that drives light emission of the light source portion 15. An output current (light emission drive current Io) from the light source power supply portion 20 is applied to the light source portion 15 based on this output voltage.

The resistor Rs is a resistor that detects a current value of the light emission drive current Io.

The control portion 21 has a control integrated circuit (IC) 22 and an input processing circuit 23. The control portion 21 controls the light source power supply portion 20, the fan motor 12a, and the actuator 17a based on a dimming signal Sg received from the vehicle via the dimming signal input terminal 54, a brightening signal Si received from the vehicle via the brightening signal input terminal 55, and the current value of the light emission drive current Io detected based on the resistor Rs.

The input processing circuit 23 produces a dimming current value command signal Sd and a brightening current value command signal Sh based on the dimming signal Sg and the brightening signal Si, and outputs these signals to the control IC 22.

The vehicular headlamp 1 according to one or more embodiments of the present invention can provide low beam lighting, high beam lighting, and DRL lighting as dim lighting by using the common light source portion 15.

Commands to implement these three kinds of lighting states are sent from the vehicle by using the two kinds of signals, namely the dimming signal Sg and the brightening signal Si. For example, commands to implement the three kinds of lighting modes, namely the low beam lighting mode, the high beam lighting mode, and the DRL lighting mode, are sent as follows.

Low beam lighting . . . dimming signal Sg: open, brightening signal Si: low

High beam lighting . . . dimming signal Sg: open, brightening signal Si: high

DRL lighting . . . dimming signal Sg: GND (ground level), brightening signal Si: low The input processing circuit 23 outputs the dimming current value command signal Sd based on such a dimming signal Sg and the brightening current value command signal Sh based on such a brightening signal Si to the control IC 22. As described later in FIGS. 5 and 6, one or more embodiments of the present invention includes a configuration example in which the input processing circuit 23 does not output the brightening current value command signal Sh.

The brightening signal Si passes through the input processing circuit 23, and is input from the actuator positive terminal 58 to a positive terminal 60 of the actuator 17*a*. A negative terminal 61 of the actuator 17*a* is connected to the actuator negative terminal 59 as a ground line of the input processing circuit 23.

With such connection, the brightening signal Si is used as driving power for the solenoid as the power portion of the actuator 17*a*.

The actuator 17*a* is off (no current is applied thereto) when the brightening signal Si is at low level, and is on (a current is applied thereto) when the brightening signal Si is at high level. As described above, when no current is applied to the actuator 17*a*, the movable shade 16 is in the first state, and the low beam light distribution state is implemented. On the other hand, when a current is applied to the actuator 17*a*, the movable shade 16 is in the second state, and the high beam light distribution state is implemented.

Switching of the light distribution state between low beam and high beam is thus implemented by switching the brightening signal Si between low and high.

A passing command from the vehicle is sent by switching the brightening signal Si to high level. That is, for the low beam lighting and the DRL lighting, the brightening signal Si is temporarily set to high level according to the passing command, so that a current is applied to the actuator 17*a*, and the high beam light distribution state is implemented.

The input processing circuit 23 is connected to the fan motor 12*a* via the fan positive terminal 56 and the fan negative terminal 57, and controls the fan motor 12*a* based on the dimming signal Si.

The control IC 22 detects the current value of the light emission drive current Io based on the voltage at both ends of the resistor Rs, and performs on/off control of a switch element of the light source power supply portion 20 as a switching regulator based on the detected current value of the light emission drive current Io, the dimming current value command signal Sd, and the brightening current value command signal Sh. That is, the control IC 22 performs duty control of an on/off control signal of the switch element. One or more embodiments of the present invention includes a configuration that does not use the brightening current value command signal Sh (described later with respect to FIGS. 5 and 6).

Specifically, the control IC 22 implements constant current control (stabilizing control) for the light emission drive current Io by performing the on/off control of the switch element so that the current value of the light emission drive current Io is kept constant at a target value.

The control IC 22 changes the target value in the constant current control based on the command of the dimming current value command signal Sd and the brightening current value command signal Sh. The amount of light emission of the light source portion 15 is thus adjusted to the amount of light emission according to the lighting mode.

Lighting mode control examples according to one or more embodiments of the present invention, in which the low beam lighting, the high beam lighting, and the DRL lighting are provided by the amount of light emission of the light source portion 15 and the operation of the actuator (solenoid) 17*a*, will be described with reference to FIG. 3.

The control portion 21 executes each lighting mode by switching the light distribution state and changing the amount of light emission (setting the current value of the light emission drive current Io). FIG. 3 shows four examples as the lighting mode control examples. The control state for passing is shown in parentheses "( )".

The lighting mode control example I is an example in which the amount of light emission of the light source portion 15 is varied among the lighting modes. For example, the lighting mode control example I is an example in which the current value of the light emission drive current Io that is output from the light source power supply portion 20 is varied among the lighting modes. For example, as shown in the figure, the light emission drive current Io is 1.5 A during the low beam lighting, 1.7 A during the high beam lighting, and 0.7 A during the DRL lighting.

Regarding the operation of the actuator (solenoid) 17*a*, the actuator (solenoid) 17*a* is turned on in the high beam lighting.

If a passing command is sent during the low beam lighting, the light emission drive current value is changed to 1.7 A and the solenoid is turned on to implement the high beam light distribution state.

If a passing command is sent during the DRL lighting, the light emission drive current value is increased to 1.7 A and the solenoid is turned on to implement the high beam light distribution state.

The lighting mode control example II is an example in which the amount of light emission of the light source portion 15 is the same in the low beam lighting and the high beam lighting, but is decreased in the DRL lighting.

That is, for example, the current value of the light emission drive current To is 1.5 A during the low beam lighting and the high beam lighting, and 0.7 A during the DRL lighting.

The solenoid is turned on in the high beam lighting.

If a passing command is sent during the low beam lighting, the light emission drive current value is retained at 1.5 A and the solenoid is turned on to implement the high beam light distribution state.

If a passing command is sent during the DRL lighting, the light emission drive current value is increased to 1.5 A and the solenoid is turned on to implement the high beam light distribution state.

The lighting mode control example III is an example in which the amount of light emission of the light source portion 15 is varied among the lighting modes, but the amount of light is further decreased in the DRL lighting.

Control for the low beam lighting and the high beam lighting is similar to that in the lighting mode control example I.

In the DRL lighting, the light emission drive current value is significantly decreased, namely 0.3 A, and the solenoid is turned on to implement the high beam light distribution state to make up for the decrease in amount of light.

If a passing command is sent during the DRL lighting, the light emission drive current value is increased to 1.7 A. The solenoid is held in the ON state.

The lighting mode control example IV is an example in which the lighting mode control examples II and III are combined. Control for the low beam lighting and the high beam lighting is similar to that in the lighting mode control example II, and control for the DRL lighting is similar to that in the lighting mode control example III.

In the lighting mode control examples I to IV described above, the light emission drive current value is increased to 1.5 A or 1.7 A if a passing command is sent during the DRL lighting. However, the present invention is not limited to this. According to one or more embodiments of the present invention, the light emission drive current value is increased so that the amount of light emission becomes larger than at least the amount of light in the DRL lighting.

Since the control portion 21 performs combined control of the light emission drive current value and activation/deactivation of the solenoid as in the above lighting mode control examples I to IV, the vehicular headlamp can be operated in the plurality of lighting modes of the low beam lighting mode, the high beam lighting mode, and the DRL lighting mode by using the single light source portion 15, e.g., the light source portion 15 as a single-chip LED. This eliminates the need to prepare a separate light source such as, e.g., an extra-high light source in order to implement the plurality of lighting modes. It should be understood that various lighting mode control examples are possible in addition to the illustrated lighting mode control examples I to IV.

The configuration and operation of the control portion 21 that implements the above plurality of lighting modes will be described below with reference to FIG. 4 by using the lighting mode control example I as an example.

Figure 4:
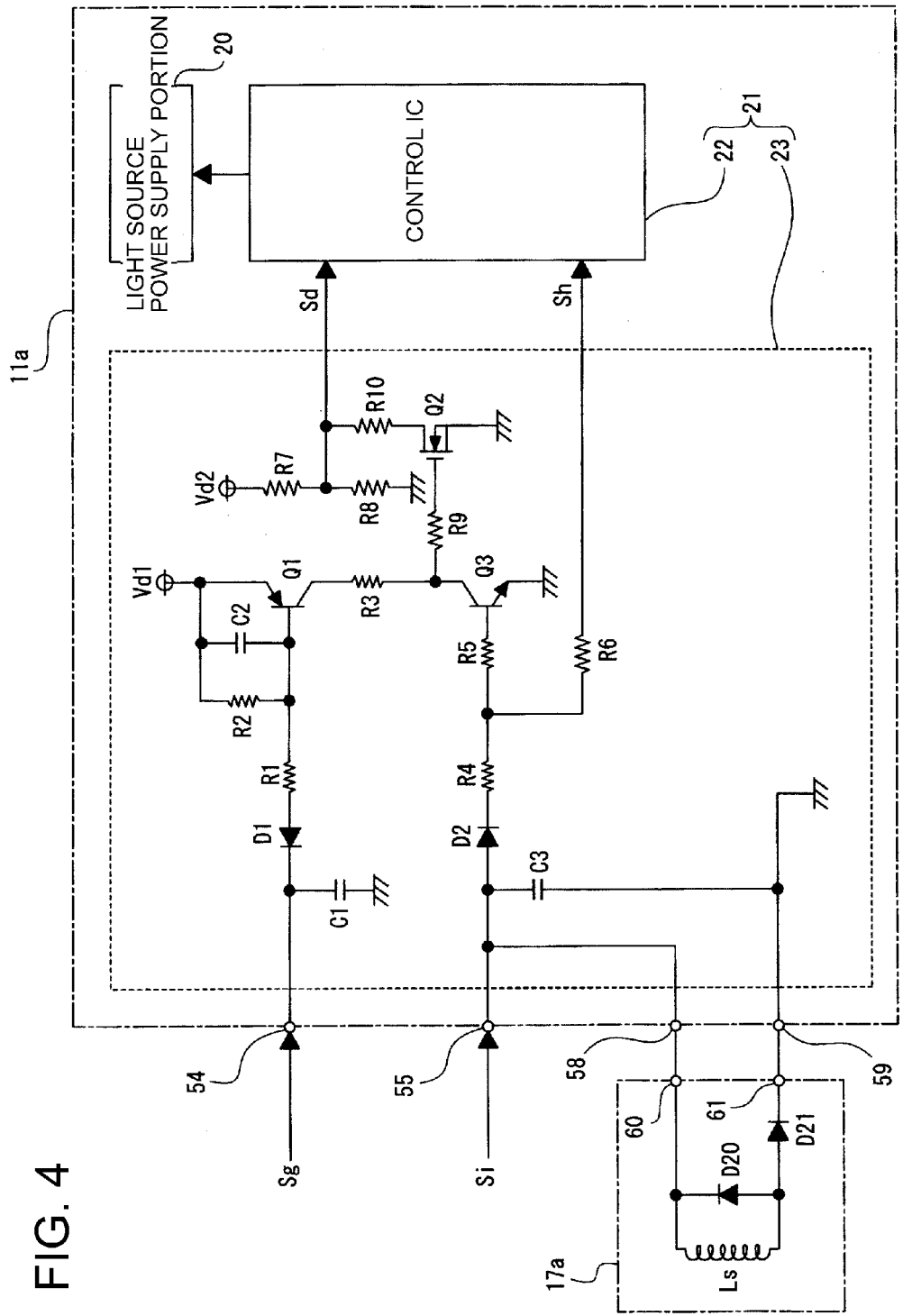
FIG. 4 is a circuit diagram as a first example of an input processing circuit portion according to one or more embodiments of the present invention.

FIG. 4 shows the control portion 21 (the control IC 22 and the input processing circuit 23) and the light source power supply portion 20 which are mounted on the circuit board 11a, and particularly shows a circuit configuration example of the input processing circuit 23. FIG. 4 also shows a coil Ls forming the solenoid as the power portion of the actuator 17a and a peripheral circuit (diodes D20, D21) thereof.

In the input processing circuit 23, the cathode of a diode D1 is connected to the dimming signal input terminal 54. A capacitor C1 is inserted between the connection point between the cathode of the diode D1 and the dimming signal input terminal 54 and the ground.

The anode of the diode D1 is connected via a resistor R1 to the base of a switching element Q1 formed by a PNP bipolar transistor. The emitter of the switching element Q1 is connected to a constant voltage source Vd1. A parallel connection circuit of a resistor R2 and a capacitor C2 is inserted between the connection point between the emitter of the switching element Q1 and the constant voltage source Vd1 and the base of the switching element Q1.

The constant voltage source Vd1 and a constant voltage source Vd2 described below generate a DC voltage at a predetermined level based on an input voltage from the on-board battery 100.

The collector of the switching element Q1 is connected via a resistor R3 and a resistor R9 to the gate of a switching element Q2 formed by an N-channel metal-oxide-semiconductor field-effect transistor (MOSFET). The source of the switching element Q2 is grounded, and the drain thereof is connected via a resistor R10 to an output line of the dimming current value command signal Sd to the control IC 22. The connection point between a resistor R7 and a resistor R8 is connected to the connection point between the output line of the dimming current value command signal Sd and the resistor R10. The resistor R7 and the resistor R8 are inserted in series between the constant voltage source Vd2 and the ground.

This configuration allows the dimming current value command signal Sd to have two different voltage values depending on whether the switching element Q2 is on or off. When the switching element Q2 is on, the dimming current value command signal Sd has a first voltage value as the voltage of the constant voltage source Vd2 divided by the resistor R7 and the parallel resistors R8, R10. When the switching element Q2 is off, the dimming current value command signal Sd has a second voltage value as the voltage of the constant voltage source Vd2 divided by the resistor R7 and the resistor R8.

In the input processing circuit 23, the anode of a diode D2 is connected to the brightening signal input terminal 55. A capacitor C3 is inserted between the connection point between the anode of the diode D2 and the brightening signal input terminal 55 and the ground. The diode D2 has a reverse connection protection function.

The cathode of the diode D2 is connected via a resistor R4 and a resistor R5 to the base of a switching element Q3 formed by an NPN bipolar transistor. The emitter of the switching element Q3 is grounded, and the collector thereof is connected to the connection point between the resistor R3 and the resistor R9.

A resistor R6 is connected to the connection point between the resistor R4 and the resistor R5. The line of the resistor R6 serves as an output line of the brightening current value command signal Sh. Accordingly, the low level or high level brightening signal Si applied to the brightening signal input terminal 55 is supplied as the brightening current value command signal Sh to the control IC 22 through a path of the diode D2 and the resistors R4, R6.

The brightening signal input terminal 55 is connected directly to the actuator positive terminal 58, and is connected to the positive terminal 60 of the actuator 17a. The negative terminal 61 of the actuator 17a is connected to the actuator negative terminal 59 of the circuit board 11a. The actuator negative terminal 59 is connected to the ground line in the circuit board 11a. With such connection, a current is applied to the coil Ls forming the solenoid (ON state) when the brightening signal Si is at high level, and no current is applied to the coil Ls (OFF state) when the brightening signal Si is at low level. In addition to the coil Ls, the diode D20 for protection against back electromotive force and the diode D21 for reverse connection prevention are provided in the actuator 17a.

For example, the control IC 22 controls the current value of the light emission drive current Io from the light source power supply portion 20 in the following manner.

Sd=second voltage value, Sh=low . . . Io=1.5 V
Sd=first voltage value, Sh=low . . . Io=0.7 V
Sh=high . . . Io=1.7 A In the configuration of FIG. 4, the control IC 22 controls the current value in this manner, whereby the operation in the lighting mode control example I is implemented as follows.

Low Beam Lighting Mode

The dimming signal Sg from the vehicle is open, and the brightening signal Si from the vehicle is at low level. In this case, all of the switching elements Q1, Q2, Q3 are turned off. The dimming current value command signal Sd therefore has the second voltage value. Moreover, the brightening current value command value Sh is at low level. The control IC 22 controls the light source power supply portion 20 accordingly so that the light emission drive current value becomes equal to, e.g., 1.5 A. The solenoid is turned off to implement the low beam light distribution state.

Passing Command During Low Beam Lighting

The brightening signal Si goes to high level and the brightening current value command signal Sh goes to high level from the above state of the low beam lighting mode. The control IC 22 controls the light source power supply portion 20 accordingly so that the light emission drive current value becomes equal to, e.g., 1.7 A. The solenoid is turned on to implement the high beam light distribution state.

High Beam Lighting Mode

The dimming signal Sg from the vehicle is open, and the brightening signal Si from the vehicle is at high level. The brightening current value command signal Sh is at high level. The control IC 22 controls the light source power supply portion 20 accordingly so that the light emission drive current value becomes equal to, e.g., 1.7 A. The solenoid is turned on to implement the high beam light distribution state.

DRL Lighting Mode

The dimming signal Sg from the vehicle is at ground level, and the brightening signal Si from the vehicle is at low level. Accordingly, the switching element Q1 is turned on, and the switching element Q3 is turned off. As a result, the switching element Q2 is turned on. The dimming current value command signal Sd therefore has the first voltage value. The brightening current value command signal Sh is at low level. The control IC 22 controls the light source power supply portion 20 accordingly so that the light emission drive current value becomes equal to, e.g., 0.7 A. The solenoid is turned off to implement the low beam light distribution state.

Passing Command During DRL Lighting

The brightening signal Si goes to high level and the brightening current value command signal Sh goes to high level from the above state of the DRL lighting mode. The control IC 22 controls the light source power supply portion 20 accordingly so that the light emission drive current value becomes equal to, e.g., 1.7 A. The solenoid is turned on to implement the high beam light distribution state.

The configuration and operation of the control portion 21 that implements the plurality of lighting modes of the lighting mode control example II of FIG. 3 will be described below with reference to FIG. 5.

The same portions as those of FIG. 4 are denoted by the same reference characters and description thereof is omitted. FIG. 5 is different from FIG. 4 in that the brightening current value command signal Sh is not used. Accordingly, the path of the brightening current value command signal Sh which has the resistor R6 in FIG. 4 is not provided in FIG. 5. The brightening signal Si is used to control the switching element Q3 and to drive the solenoid.

For example, the control IC 22 controls the current value of the light emission drive current Io from the light source power supply portion 20 in the following manner according to the dimming current value command signal Sd.

Sd=second voltage value . . . Io=1.5 V
Sd=first voltage value . . . Io=0.7 V

Figure 5:
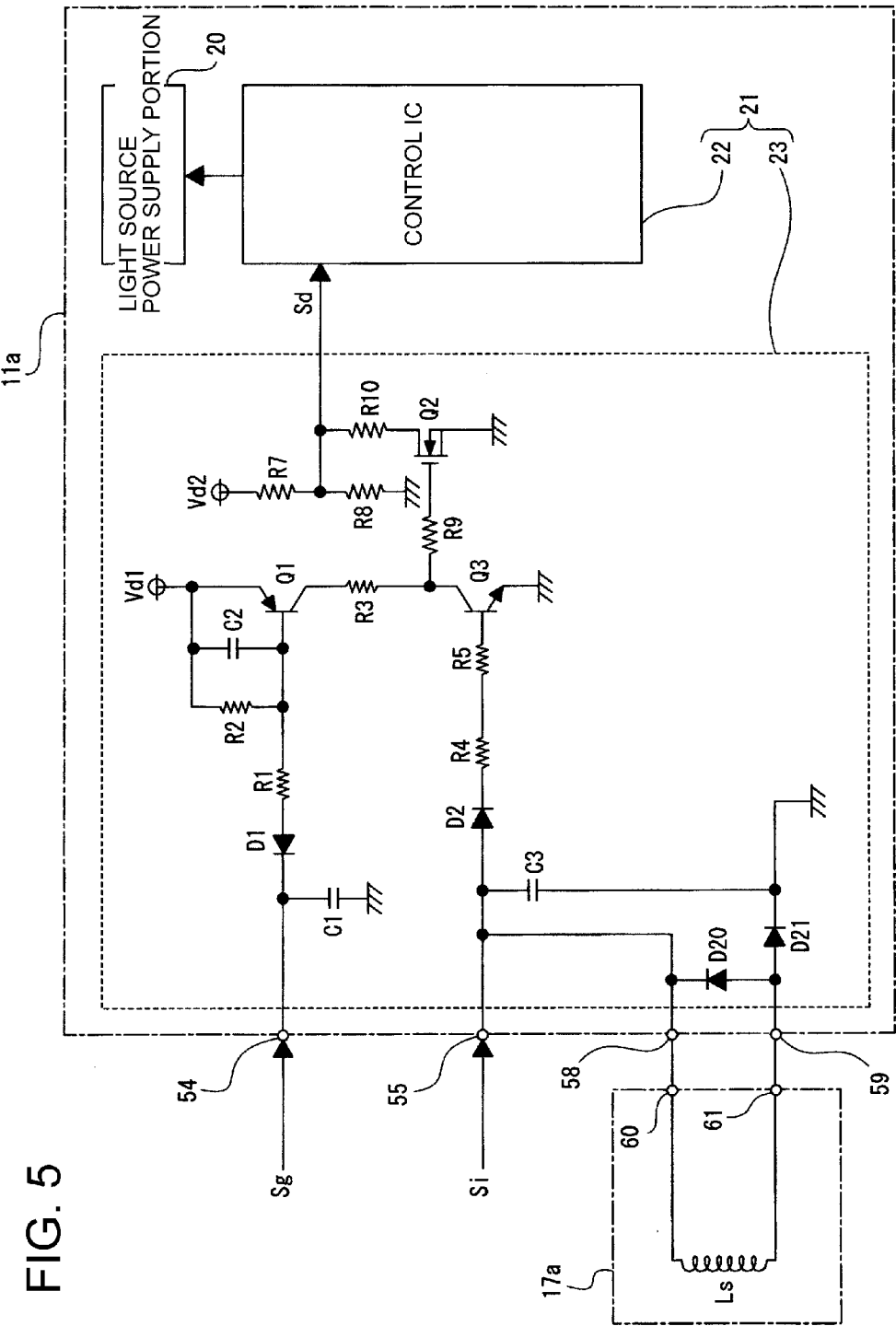
FIG. 5 is a circuit diagram as a second example of the input processing circuit portion according to one or more embodiments of the present invention.

In the configuration of FIG. 5, the control IC 22 controls the current value in this manner, whereby the operation in the lighting mode control example II is implemented as follows.

Low Beam Lighting Mode

The dimming signal Sg from the vehicle is open, and the brightening signal Si from the vehicle is at low level. In this case, all of the switching elements Q1, Q2, Q3 are turned off. The dimming current value command signal Sd therefore has the second voltage value. The control IC 22 controls the light source power supply portion 20 accordingly so that the light emission drive current value becomes equal to 1.5 A. The solenoid is turned off to implement the low beam light distribution state.

Passing Command During Low Beam Lighting

The brightening signal Si goes to high level from the above state of the low beam lighting mode. The dimming current value command signal Sd is retained at the second voltage value, and the light emission drive current value is also retained at 1.5 A, but the solenoid is turned on to implement the high beam light distribution state.

High Beam Lighting Mode

The operation is similar to that in the case of "passing command during low beam lighting" described above. The light emission drive current value is 1.5 A, which is the same as in the low beam lighting mode. However, the solenoid is turned on to implement the high beam light distribution state.

DRL Lighting Mode

The dimming signal Sg from the vehicle is at ground level, and the brightening signal Si from the vehicle is at low level. Accordingly, the switching element Q1 is turned on, and the switching element Q3 is turned off. As a result, the switching element Q2 is turned on. The dimming current value command signal Sd therefore has the first voltage value. The control IC 22 controls the light source power supply portion 20 accordingly so that the light emission drive current value becomes equal to, e.g., 0.7 A. The solenoid is turned off to implement the low beam light distribution state.

Passing Command During DRL Lighting

The brightening signal Si goes to high level from the above state of the DRL lighting mode, and the switching element Q3 is turned on. As a result, the switching element Q2 is turned off. The dimming current value command value Sd therefore has the second value. The control IC 22 controls the light source power supply portion 20 accordingly so that the light emission drive current value becomes equal to, e.g., 1.5 A. The solenoid is turned on to implement the high beam light distribution state.

Although the configurations that implement the lighting mode control examples I, II are described above with reference to FIGS. 4 and 5, the configurations for the lighting mode control examples III, IV are also possible. In this case, the configurations can be employed in which the control IC 22 controls the light emission drive current value to, e.g., 0.3 A when the dimming current value command signal Sd has the first voltage value, and the solenoid is turned on even when the dimming signal Sg is at ground level.

The solenoid peripheral circuit in FIGS. 4 and 5 will be described. In the example shown in FIG. 4, the coil Ls and the diodes D20, D21 are provided in the actuator 17a. The circuit configuration of the solenoid thus sometimes forms a circuit including a diode in order to protect against reverse connection or to suppress an induced voltage. In this case, however, the diodes D20, D21 are connected as circuit components in a unit serving as a solenoid actuator. This requires mounting of a resin housing containing bus bars having leads of electronic parts such as diodes being connected and fixed to a plurality of metal plates by welding etc., or mounting of an electronic circuit substrate. This prevents reduction in size of the actuator unit or is disadvantageous in terms of reduction in cost.

Accordingly, the diodes D20, D21 are placed on the circuit board 11a for lighting control as shown in FIG. 5. That is, the anode of the diode D20 is connected to the actuator negative terminal 59 and the cathode thereof is connected to the actuator positive terminal 58 on the circuit board 11a. Moreover, the anode of the diode D21 is connected to the actuator negative terminal 59, and the cathode thereof is connected to the ground. This configuration eliminates the need to provide bus bar lines or mount a circuit board for the actuator 17a. This facilitates reduction in size of the actuator unit and reduction in cost.

Figure 6:
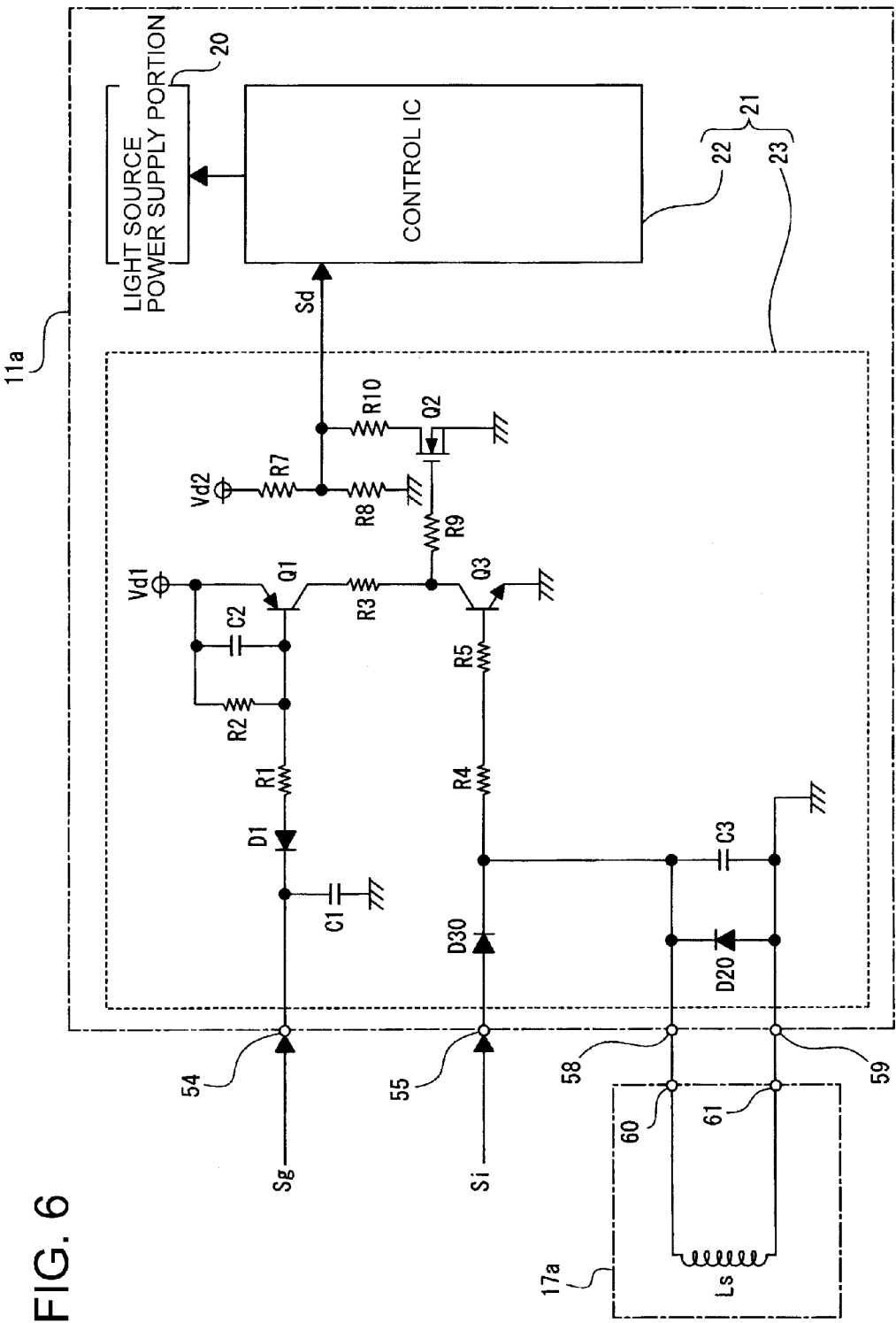
FIG. 6 is a circuit diagram as a third example of the input processing circuit portion according to one or more embodiments of the present invention.

In the configuration example of FIG. 6, a common part is used as the reverse connection protection diode D21 for the solenoid and the reverse connection protection diode D2 for the lighting control circuit in the circuit configuration of FIG. 5 in order to reduce the number of parts.

That is, the anode of a diode D30 for reverse connection protection is connected to the brightening signal input terminal 55, and the cathode thereof is connected to the resistor R4 and the actuator positive terminal 58. The diode D30 thus performs a reverse connection protection function for the solenoid and the lighting control circuit. This configuration facilitates reduction in size of the actuator unit and reduction in cost as the vehicular headlamp.

The vehicular headlamp according to one or more embodiments of the present invention includes the light source portion 15 that provides lighting in each lighting mode of the low beam lighting, the high beam lighting, and the dimming lighting (DRL lighting), the light source power supply portion 20 that supplies to the light source portion 15 the lighting current to having a current value according to the lighting mode, the light distribution mechanism portion (actuator 17a) that switches light distribution of illumination light by the light source portion 15 according to the lighting mode, and the control portion 21 (the control IC 22 and the input processing circuit 23). In the DRL lighting, the control portion 21 causes the light source power supply portion 20 to supply the lighting current having the second current value (e.g., 0.7 A or 0.3 A) lower than the first current value (e.g., 1.5 A) for the low beam lighting. If a passing command is sent during the DRL lighting, the control portion 2 causes the light source power supply portion 20 to supply the lighting current Io having a current value (e.g., 1.5 A or 1.7 A) higher than the second current value, and causes the actuator 17a to implement the high beam light distribution state.

Accordingly, even if a passing command is sent during the DRL (dimming) lighting, the passing operation can be performed with a large amount of light in the high beam light distribution state, and a sufficient passing function can be implemented.

The control portion 21 executes the low beam lighting, the high beam lighting, and the dimming lighting by combination of switching of the lighting current Io between or among two or more different current values including the first and second current values and switching of light distribution by the actuator 17a (lighting mode control examples I to IV). Thus, the light emission state required for each lighting mode can be implemented by using different amounts of light and different light distribution states.

The circuit components (diodes D20, D21) other than the coil Ls forming the drive circuit that drives the power portion (solenoid) of the actuator 17a are mounted on the circuit board 11a having the circuit components as the control portion 21 mounted thereon (FIG. 5). That is, no part as a circuit element (circuit element part requiring a substrate or a bus bar) other than the coil Ls (it should be understood that the coil Ls includes a wiring member for the coil Ls) is mounted on the actuator 17a.

Moreover, the reverse connection protection diode D30 in the circuit components of the control portion is used also as the reverse connection protection diode in the drive circuit of the actuator 17a (FIG. 6). These configurations can implement reduction in size of the actuator 17a and reduction in cost as the vehicular headlamp.

The present invention is not limited to the configuration of the above embodiments, and various modifications can be made.

For example, one or more embodiments of the present invention includes the configuration in which a drive current is applied from a single light source power supply portion 20 while switching between or among a plurality of light source units.

One or more embodiments of the present invention also includes the case where a passing command is sent from the vehicle as a signal of a different channel from a high beam command.

Although the actuator 17a using the solenoid as its power portion is shown as an example of the light distribution mechanism portion, a motor may be used as the power portion instead of the solenoid to drive the movable shade for light distribution.

Although the DRL lighting mode is shown as an example of the dimming lighting mode, lighting states having other functions such as, e.g., a clearance lamp lighting mode may be applied to one or more embodiments of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF THE REFERENCE NUMERALS

1 VEHICULAR HEADLAMP
11 CONTROL CIRCUIT UNIT
11a CIRCUIT BOARD
15 LIGHT SOURCE PORTION
17a ACTUATOR
20 LIGHT SOURCE POWER SUPPLY PORTION
21 CONTROL PORTION
22 CONTROL IC
23 INPUT PROCESSING CIRCUIT

What is claimed is:
1. A vehicular headlamp, comprising:
a light source portion that provides a low beam lighting mode, a high beam lighting mode, and a dimming lighting mode;
a light source power supply portion that supplies to the light source portion a lighting current having a current value according to lighting mode;

a light distribution mechanism portion that switches light distribution of illumination light by the light source portion according to the lighting mode; and a control portion that, at least in the dimming lighting mode, causes the light source power supply portion to supply lighting current having a second current value lower than a first current value for the low beam lighting mode, wherein, if a passing command is sent during the dimming lighting mode, the control portion causes the light source power supply portion to supply lighting current having a current value higher than the second current value and causes the light distribution mechanism portion to implement light distribution of the high beam lighting mode, and wherein the light distribution mechanism portion is operable to implement a low beam distribution state and a high beam distribution state.

2. The vehicular headlamp according to claim 1, wherein the control portion executes the low beam lighting mode, the high beam lighting mode, and the dimming lighting mode by combination of switching of the lighting current from the light source power supply portion between or among two or more different current values including the first and second current values and switching of the light distribution by the light distribution mechanism portion.

3. The vehicular headlamp according to claim 2, wherein the light distribution mechanism portion has an actuator that switches the light distribution, and wherein a circuit component other than a coil forming a drive circuit that drives a power portion of the actuator is mounted on a circuit board having at least a circuit component as the control portion mounted thereon.

4. The vehicular headlamp according to claim 3, wherein wherein a reverse connection protection diode in the circuit component of the control portion is used also as a reverse connection protection diode in the drive circuit of the actuator.

5. The vehicular headlamp according to claim 1, wherein the light distribution mechanism portion has an actuator that switches the light distribution, and wherein a circuit component other than a coil forming a drive circuit that drives a power portion of the actuator is mounted on a circuit board having at least a circuit component as the control portion mounted thereon.

6. The vehicular headlamp according to claim 5, wherein wherein a reverse connection protection diode in the circuit component of the control portion is used also as a reverse connection protection diode in the drive circuit of the actuator.

* * * * *